(12) United States Patent
Schneider (10) Patent No.: US 10,541,632 B2
(45) Date of Patent: Jan. 21, 2020

(54) SENSORLESS COMMUTATION METHOD (71) Applicant: ebm-papst Mulfingen GmbH & Co. KG, Mulfingen (DE)

(72) Inventor: Fabian Schneider, Rot am See (DE)

(73) Assignee: ebm-papst Mulfingen GmbH & Co. KG, Mulfingen (DE)

(*) Notice: Subject to any disclaimer, the term of this patent is extended or adjusted under 35 U.S.C. 154(b) by 3 days.

(21) Appl. No.: 15/551,328

(22) PCT Filed: Jan. 14, 2016

(86) PCT No.: PCT/EP2016/050698
§ 371 (c)(1),
(2) Date: Aug. 16, 2017

(87) PCT Pub. No.: WO2016/134877
PCT Pub. Date: Sep. 1, 2016

(65) Prior Publication Data
US 2018/0069494 A1 Mar. 8, 2018

(30) Foreign Application Priority Data
Feb. 23, 2015 (DE) .................. 10 2015 102 565

(51) Int. Cl.
*H02P 6/182* (2016.01)
*H02P 21/24* (2016.01)
(Continued)

(52) U.S. Cl.
CPC ............. *H02P 6/17* (2016.02); *H02P 6/182* (2013.01); *H02P 21/04* (2013.01); *H02P 21/13* (2013.01); *H02P 21/32* (2016.02)

(58) Field of Classification Search
CPC .. H02P 6/18; H02P 21/24; H02P 6/17; H02M 3/33507
See application file for complete search history.

(56) References Cited

U.S. PATENT DOCUMENTS 7,334,854 B1 2/2008 Chang et al.
8,294,397 B2 10/2012 Horng et al.
(Continued)

FOREIGN PATENT DOCUMENTS

EP 1758240 A2 2/2007
EP 2061147 A2 5/2009

OTHER PUBLICATIONS

Rolando et al. "Design and Evaluation of a PLL-Based Position Controller for Sensorless Vector Control of Permanent-Magnet Synchronous Machines". IEEE Industrial Electronics, IECON 2006-32nd Annual Conference on, IEE, Piscataway, NJ, USA, Nov. 1, 2006 (Nov. 1, 2006), pp. 5081-5086, XP031077770, ISBN: 978-1-42440135-2.*

(Continued)

*Primary Examiner* — Bickey Dhakal
*Assistant Examiner* — Cortez M Cook
(74) *Attorney, Agent, or Firm* — Harness, Dickey & Pierce, P.L.C.

(57) ABSTRACT

The present invention relates to a circuit arrangement and to a method for sensorless commutation of electronically commutated synchronous machines such as, for example, EC motors, wherein the terminal values at the connection terminals of the synchronous machine are processed by means of a rotor position estimator based on the EMF of the synchronous machine and of a known motor model preferably in a PLL structure for sensorless determination of rotor position information, and said information is used for commutation.

15 Claims, 8 Drawing Sheets (51) Int. Cl.
*H02M 3/335* (2006.01)
*H02P 6/17* (2016.01)
*H02P 21/04* (2006.01)
*H02P 21/13* (2006.01)
*H02P 21/32* (2016.01)

(56) References Cited

U.S. PATENT DOCUMENTS

| | | | |
|---|---|---|---|
| 8,340,848 B2 | 12/2012 | Son et al. | |
| 8,760,098 B2 | 6/2014 | Qin | |
| 2006/0285366 A1* | 12/2006 | Radecker | H02M 3/33507 363/16 |
| 2010/0181952 A1 | 7/2010 | Cheng | |
| 2013/0320897 A1* | 12/2013 | Hirono | H02P 6/182 318/400.34 |
| 2014/0333241 A1* | 11/2014 | Zhao | H02P 21/24 318/400.02 |

OTHER PUBLICATIONS

Rolando P. Burgos et al., "Design and Evaluation of a PLL-Based Position Controller for Sensorless Vector Control of Permanent-Magnet Synchronous Machines", IEEE Industrial Electronics, IECON 2006—32nd Annual Conference on IEEE, Nov. 1, 2006, pp. 5081-5086.

Lin Qinghua et al., "A novel position detection method of sensorless brushless DC motor based on sliding mode observer", Power Electronics Systems and Applications (PESA), 2011 4th International Conference on IEEE, Jun. 8, 2011, pp. 1-5.

C. Olivieri et al.: "A novel PLL scheme for a sensorless PMSM drive overcoming common speed reversal problems", Power Electronics, Electrical Drives, Automation and Motion (SPEEDAM), 2012 International Symposium on IEEE, Jun. 20, 2012, pp. 1051-1056.

* cited by examiner

SENSORLESS COMMUTATION METHOD

This application is a U.S. National Phase Application under 35 U.S.C. 371 of International Application No. PCT/EP2016/050698 filed on Jan. 14, 2016 and published in German as WO 2016/134877 A1 on Sep. 1, 2016. This application claims priority to German Application No. 10 2015 102 565.5 filed on Feb. 23, 2015. The entire disclosures of all of the above applications are incorporated herein by reference.

The invention relates to a circuit arrangement and to a method for sensorless commutation of electronically commutated synchronous machines such as, for example, EC motors.

Various EC motors are known from the prior art. Thus, for example, in electrical drive technology, the brushless DC motor (BLDC; brushless DC motor) is becoming increasingly popular. Since this type of motor involves no mechanical or electrical contact between the stator and the rotor of the BLDC motor, alternative requirements are placed on the motor control for determining the relative position thereof. Therefore, two possible methods exist for BLDC motors: sensor-controlled commutation or sensorless commutation.

In sensor-controlled commutation, Hall sensors for the determination of the magnetic flux of the rotor or optical sensors in the area of the stator are used, for example. In accordance with the concrete position information, the rotor windings are activated via suitable power drivers by the control electronics in order to generate a torque.

An alternative method is sensorless commutation, in which, for example, the measurement of the back EMF is used for the position determination. The acquisition of the rotor position occurs by means of a control which can evaluate the counter voltage triggered in the coils of the stator. However, in order to evaluate the counter voltage, a certain minimum rotation speed is required. This has the consequence that sensorless EC motors have to be blindly commutated until reaching the minimum rotation speed.

Methods relating to sensorless commutation in motor startup are known, for example, from the printed publications US 2010/0181952 A1, EP 2 061 147 A2, U.S. Pat. Nos. 8,294,397 B2 and 7,334,854 B1.

Furthermore, methods for sensorless commutation in normal operation are known from the printed publications U.S. Pat. Nos. 8,340,848 B2 and 8,760,098 B2.

However, at this time commutation methods exist by means of which an EC motor does not have to be blindly controlled even below a minimum rotation speed, i.e., particularly during motor startup from standstill. For this purpose, at standstill of the rotor, short current pulses are sent to the rotor coils, which are indeed influenced by the magnetic field of the rotor, although they do not set the motor in movement. When magnetic field lines intersect the motor coils, then, based on the generator principle, a voltage is induced in these coils even during motor operation. This induced voltage, like the operating voltage, is polarized and acts therefore against the rotor current. It is referred to as counter voltage or counter EMF.

According to Lenz's law, this electromotive force (EMF) generates a secondary magnetic field which opposes the original change in magnetic flux that brings about the motor rotation. For a motor with fixed magnetic flux and fixed number of windings, the value of the EMF is proportional to the angular speed of the rotor.

This EMF value is also referred to as "back EMF constant," which can be used in order to determine the back EMF for a given rotation speed. The potential on a winding can be calculated by subtracting the back EMF from the supply voltage. When the electric motor is running at nominal rotation speed, the resulting voltage (potential difference between back EMF and supply voltage) generates a current flux, referred to as nominal current; here, the motor is delivering the nominal torque thereof.

Furthermore, in the prior art, for example, three-phase gate driver ICs for sensorless commutation of brushless direct current motors are known, which are operated with block commutation (trapezoidal), wherein no position sensors are therefore required for the phase commutation, since the necessary control signals are derived from the counter EMF.

In order to be able to implement a sensorless field-oriented regulation, various methods are known, which can be used with a varying degree of effort. Here, the determination of the position of the rotor occurs via an estimation. A model known from the prior art is the so-called "Model Reference Adaptive Control (MRAC)" method, which is used for the estimation of the motor rotation speed. The basic procedure of such adaptive methods is the comparison of real data of the system in question with model data. The adaptive methods have feedback for improving the estimated value, and thereby the error between the measured values and the estimated values is used in order to adapt the adaptive model (AM) to the reference model (RM).

However, the methods known in the prior art have various disadvantages. Thus, in part, a larger number of operators is necessary. Furthermore, an orientation process or an acquisition of the initial position for the startup, for example, a noise intensive test signal, is routinely necessary. In addition, the time for the orientation is usually disadvantageous in the known methods. Therefore, it is desirable to be able to start immediately without orientation time.

As far as the startup and operation of the motor are concerned, it would moreover be advantageous if it were possible to react to dynamic load variations, and if the startup would be enabled already under variable load conditions. Furthermore, in the methods known from the prior art, the circumstance that the transition from startup to stationary load operation is designed as a multi-step process is disadvantageous. It would be desirable if a continuous process from startup to load operation were possible.

The aim of the present invention is to overcome the above-mentioned disadvantages and to provide an alternative and improved method for sensorless commutation, in particular for sensorless sinusoidal commutation of EC synchronous machines, and to provide a device for carrying out such a method.

This aim is achieved by a circuit arrangement for sensorless commutation of an EC motor, having the features of claim 1, and by a method having the features of claim 6.

An aspect of the invention relates to the rotor position estimation. Therefore, the use of an EMF-based rotor position estimator is proposed, for the sensorless commutation of an EC motor with a continuous, stepless process from start (startup) to stationary operation of the motor.

Input values that are necessary for the position estimation are the three motor phase currents as well as the three electrical voltages applied to the terminals of the commutation circuit. These terminal values of the motor, i.e., the motor phase currents and the terminal voltages, are processed in the rotor position estimator based on a known motor model, preferably in a PLL structure (Phase Locked Loop) into rotor position information which originates from the EMF of the machine. Based on the rotor position thus determined, the commutation of the motor (for example, sinusoidal U, field-oriented regulation) can occur.

According to the invention, a switching between the respective measured terminal voltage and the calculated terminal voltage as a function of the commutation state is provided. If no commutation occurs, the terminal voltage is acquired via a sensor system. In the case of active commutation, the terminal voltages are calculated from the instantaneously given duty factors of the associated half bridges and a measured intermediate circuit voltage. In this manner, it is possible to dispense with a filter for filtering out the pulse-frequency portions in the measurement signal.

According to the invention, it is provided moreover that a phase regulation loop (PLL configuration) is provided for the rotor position estimation, which carries out a transformation of the measured values into a coordinate system rotating synchronously with the rotor, the rotation angle of which originates from the PLL structure itself and which corresponds to the rotor position which is needed for the commutation. Furthermore, the PLL configuration comprises an observer for the acquisition of the EMF values of the machine in the rotating coordinate system based on the motor model thereof in the same coordinate system.

In order to achieve an optimal signal quality of the EMF values, the following is proposed: the relevant current can be determined by solving the machine equations in accordance with the temporal current derivations and by performing the integration with a hypothetical (theoretical) EMF and the measured values. The differences between this calculated current and the measured current can be assumed to be caused by the EMF. Consequently, the weighted difference between the calculated current and the measured current is returned as the previously hypothetically assumed EMF and output as EMF output signal of the observer.

A phase regulation loop thus configured has the advantage that a differentiation of measurement signals, such as currents, can be avoided, and the output EMF receives a low-pass characteristic with settable bandwidth which can be adapted to the required dynamics.

Furthermore, according to the invention it can be provided that low-pass filters for the measured currents are provided, which are used for calculating the above-mentioned current difference in the observer. In this manner, the startup characteristic is optimized, and, moreover, an overall increased signal quality (particularly in the case of a current measurement affected by an interfering signal) of the EMF estimation is achieved.

Another aspect of the invention relates to a phase detector and to a phase regulator, wherein the phase detector determines the phase angle (angular offset) of the EMF vector in the d/q coordinate system with respect to the q axis.

The phase regulator is designed in order to adjust to zero the angular offset originating from the phase detector, for example, by means of a PI regulator by increasing or lowering the rotation speed of the rotating observer coordinate system via the frequency setpoint for the downstream oscillator. The activation of the phase regulator occurs preferably via a detector. The detector activates the phase regulator for minimum signal strengths of the terminal values in order to ensure that a correction of the coordinate systems is carried out only in the case of sufficient signal strength and signal quality of the estimation of the EMF in the observer.

An unequivocal assignment of the position of the rotating coordinate system to the rotation direction and to the mathematical sign of the q component (with respect to the d/q coordinate system) is achieved via a specific output saturation of the phase regulator. A positive q component of the EMF causes a positive rotation direction or frequency. The fact that, due to the mentioned output saturation of the phase regulator, a minimum frequency for the generation of the EMF for starting the motor is ensured can be considered an additional advantage of the configuration according to the invention.

So that, in the case of an already rotating machine, the PLL configuration can reliably synchronize said machine in the locked state (PLL "lock"), it is advantageously provided that the I portion of the phase regulator can be set to an initial value by an "anti-windup" wiring of the saturation element in the case of an output saturation. In the case of active commutation of the machine, this initial value is set using the value zero; otherwise it is set using the rotation speed value of the initial speed determination from the EMF.

For the coordinate system transformation (rotor position), a frequency-controlled oscillator generates the rotation angle by integration of the given frequency setpoint. The temporal change, i.e., the differentiation of the rotation angle, gives the rotation frequency of the rotor. The input signal of the oscillator can be used, for example, directly as rotation speed signal for a superposed motor commutation.

Optionally, it is possible to provide that the initial speed determination (initial value) from the EMF for the direct determination of the rotation frequency is carried out from the measured terminal voltages in a currentless motor (no active commutation). By means of an arctangent calculation (a tan 2), the rotor position is determined directly from the terminal voltages transformed into the system, and the rotation frequency is determined from the differentiation (time derivative) of said rotor position.

Other advantageous developments of the invention are characterized in the dependent claims or represented in further detail below together with the description of the preferred design of the invention.

Figure 1:
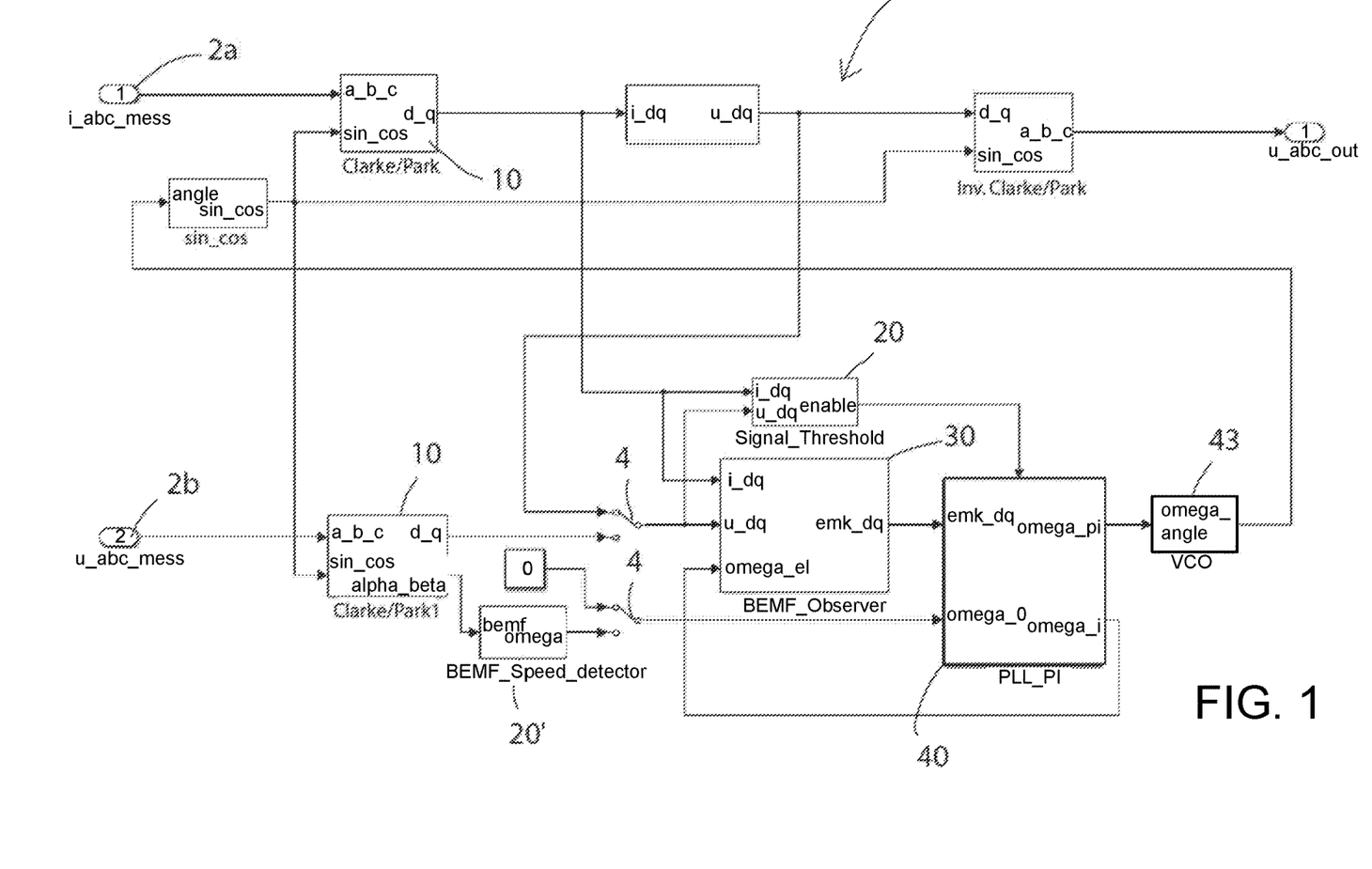
FIG. 1 shows a block diagram of an embodiment of the circuit arrangement according to the invention.

In FIG. 1, an embodiment example of the invention in the form of a block diagram is represented. Represented is a circuit arrangement 1 for the rotor-position-sensorless commutation of an EC motor in a stepless continuous process, i.e., from startup to stationary operation of the motor, wherein the circuit arrangement 1 for the acquisition of the terminal values of the motor is connected to said motor via a connection 2a, 2b. The circuit arrangement 1 comprises a respective Clarke-Park transformer 10 for the transformation of the corresponding terminal values (current and terminal voltage) into a d/q observer coordinate system rotating synchronously with the rotor of the motor, as well as a detector 20 which is designed for the determination of minimum signal values, an observer 30 for the estimation of the EMF (electromotive force), and a PLL structure 40 for the orientation of the observer coordinate system.

By means of the transformations, the electrical terminal values (currents $i_u$, $i_v$, $i_w$ and voltages $u_u$, $u_v$, $u_w$) of the permanently excited synchronous machine are transformed from the three-phase stator abc system first into the two-phase orthogonal alphabeta system by means of a Clarke transformation and then further into a rotating d/q observer coordinate system by means of a Park transformation. The position of the observer coordinate system is corrected during the operation by the targeted evaluation of the EMF of the synchronous machine with respect to the d/q system of the machine oriented toward the rotor flux and used for the modeling of the machine. In the stationary state, the two coordinate systems lie exactly one over the other, wherein a real system corresponding to the model system is assumed. In this manner, a regulation for the operation or commutation of the machine (for example, field-oriented regulation) can be integrated directly in this observer coordinate system, or the transformation angle of the observer coordinate system can be used as electrical rotor position angle for an external commutation.

Figure 5:
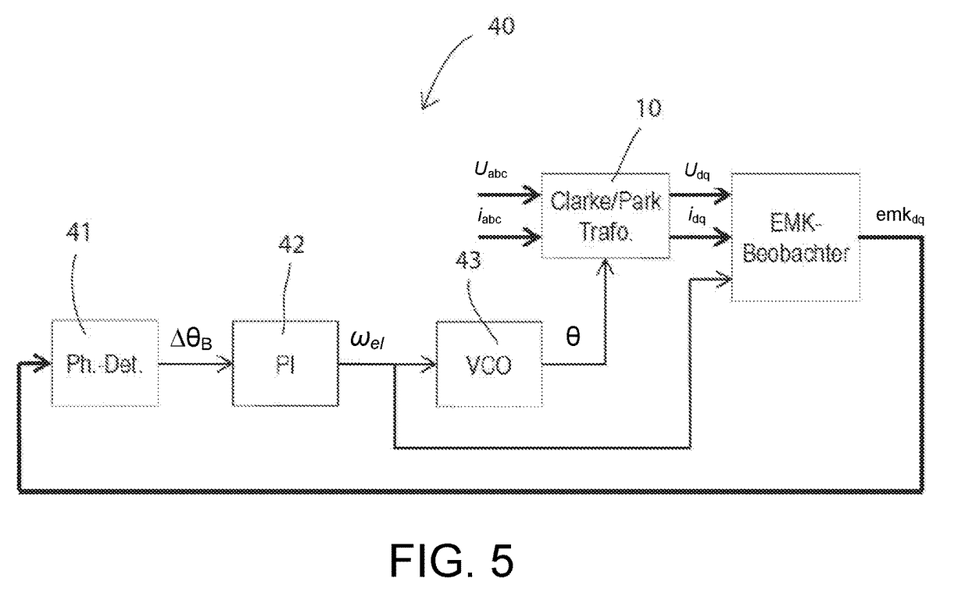
FIG. 5 shows a block diagram of an exemplary PLL regulation loop of the overall system.

The PLL structure 40 contains a phase detector 41 and a phase regulator 42 (see FIG. 5) and is designed in order to adjust to zero the angular offset originating from the phase detector 41, for example, by means of a PI regulator by increasing or lowering the rotation speed of the rotating observer coordinate system via the frequency setpoint for the downstream oscillator 43. As can be seen in FIG. 1, the activation of the phase regulator 42 occurs preferably via a detector 20 which is connected to the observer 30 and to the PLL structure 40 via a regulation loop. The detector 20 activates the phase regulator 42 for minimum signal strengths (signal threshold) of the terminal values, in order to ensure that a correction of the coordinate systems is carried out only in the case of sufficient signal strength and signal quality of the estimation of the EMF in the observer 30.

Furthermore, in this embodiment example, a detector 20' (speed detector) which can be connected via a switch 4 to the input of the PLL structure is provided.

Figure 2:
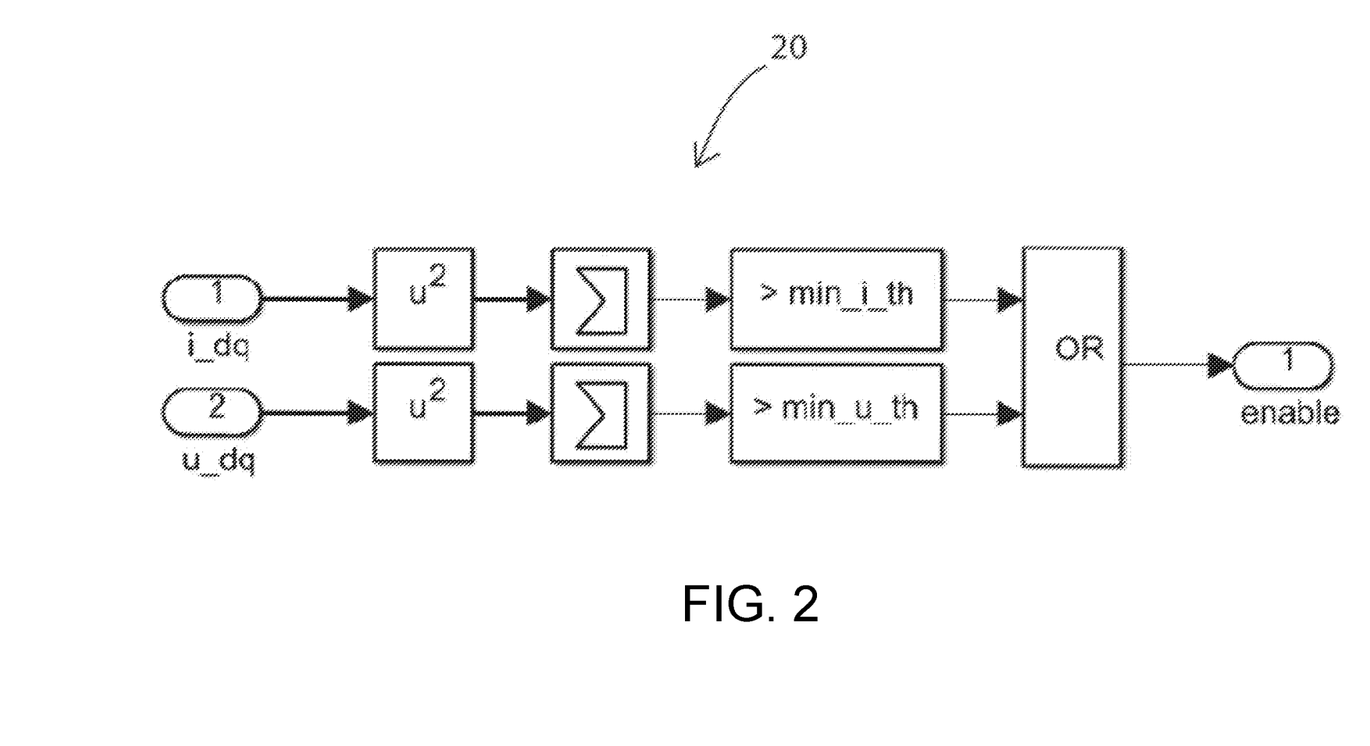
FIG. 2 shows a block diagram of the mode of operation of a detector for minimum signal strengths.

The mode of operation of the detector 20 shown in FIG. 1 is explained in greater detail with the aid of the block diagram of FIG. 2. The detector 20 is used for determining the minimum signal strengths by first determining the squares of the absolute values of the terminal values in the d/q observer coordinate system. Subsequently, the squares of the absolute values are compared with lower limit values which are defined in the system, for the reliable signal evaluation. The purpose is to ensure that only signals that can be evaluated reliably are also taken into account. If the stored threshold value for current amplitude and/or the voltage amplitude is exceeded, then, by means of a detector 20, the phase regulator 42 of the PLL structure 40 is activated for the coordinate system correction. However, if the signal strengths are too low, then no reliable estimation of the EMF in the observer 30 is possible. The establishment of the threshold values occurs based on the properties of the signal electronics of the current and voltage measurement, i.e., based on the expected offset, the noise components and the signal resolutions.

The terminal voltages applied to the connection terminals of the machine are determined, as desired, either directly by measurement via a resistance network (for example, in the outlet or in an external drive) or, alternatively under load in case of active current feed, are calculated by the commutation method based on the given PWM duty factors and the current instantaneous value of the measured intermediate circuit voltage.

Figure 3:
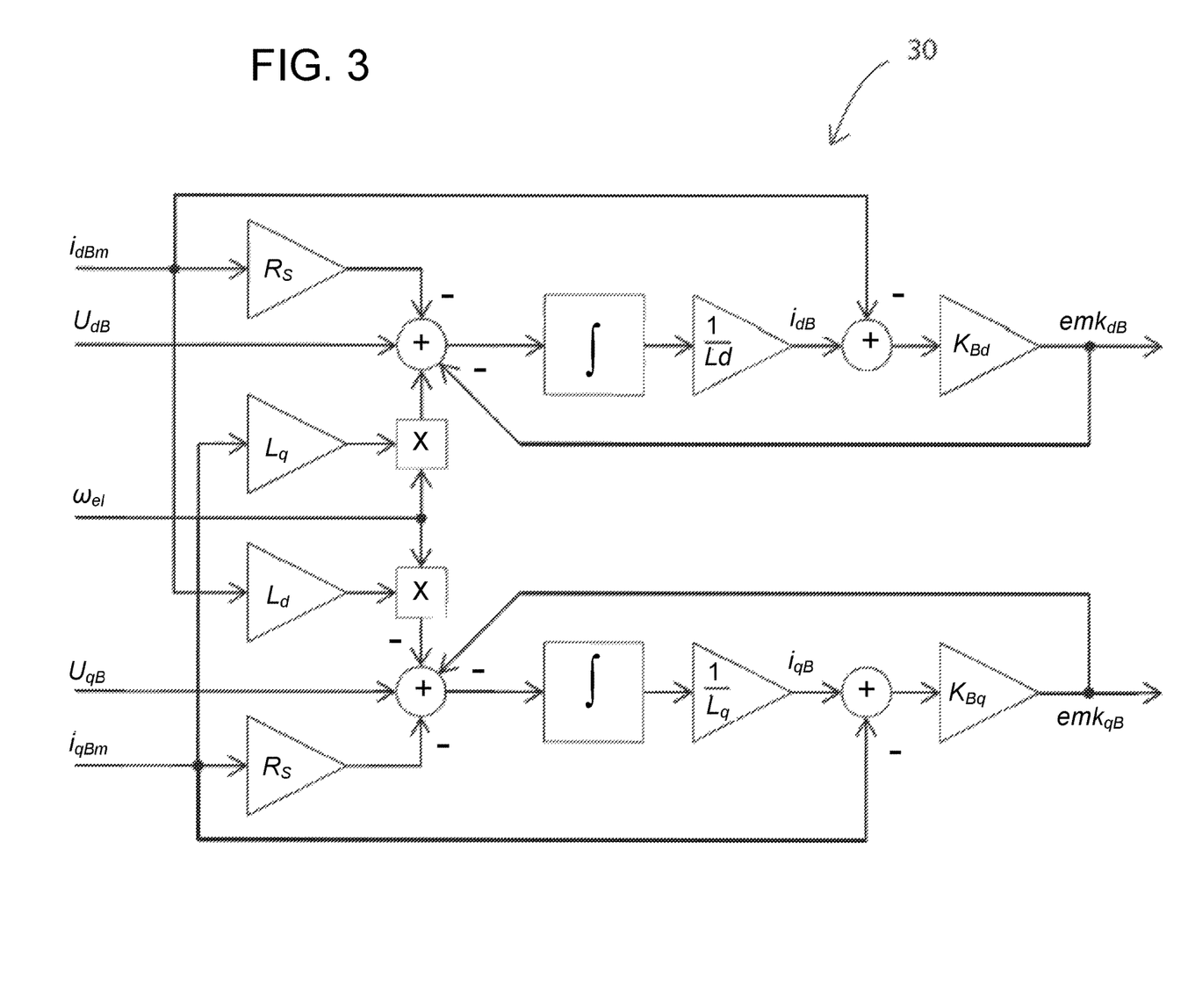
FIG. 3 shows a block diagram of the EMF observer.

The estimation of the EMF by means of the observer 30 occurs in the d/q observer coordinate system rotating with rotor rotation frequency, based on the voltages and currents applied to the terminals of the machine and on the model equations of the synchronous machine concerning these coordinates.

In the estimation, a theoretical or hypothetical EMF is used for the calculation. The estimated currents are compared directly with the currents actually measured at the terminals, and the difference is multiplied by a defined amplification factor and interpreted as the previously hypothetically assumed EMF, since, if the model equations are correct, a deviation of The signal thus determined is now returned again as EMF input signal to the current estimation and, furthermore, is also used as EMF output signal of the observer 30. By means of this method of estimation, the EMF is determined from the difference between the output signal of an integrator and the measured currents. Thus, a high signal quality is achieved, and no additional derivations of measured signals are necessary for the calculation.

For the calculations in the observer, the ideal model equations are used largely unchanged; they are as follows:

Model equation for the rotor flux d/q system:

$$\begin{pmatrix} u_d \\ u_q \end{pmatrix} = R_s \cdot \begin{pmatrix} i_d \\ i_q \end{pmatrix} + \begin{pmatrix} L_d & 0 \\ 0 & L_q \end{pmatrix} \cdot \frac{d}{dt}\begin{pmatrix} i_d \\ i_q \end{pmatrix} + \omega_{el} \cdot \begin{pmatrix} 0 & -L_q \\ L_d & 0 \end{pmatrix} \cdot \begin{pmatrix} i_d \\ i_q \end{pmatrix} + \omega_{el} \cdot \begin{pmatrix} 0 \\ \Psi_p \end{pmatrix}$$

Model equation for the d/q observer coordinate system:

$$\begin{pmatrix} u_{dB} \\ u_{qB} \end{pmatrix} = R_s \cdot \begin{pmatrix} i_{dB} \\ i_{qB} \end{pmatrix} + \begin{pmatrix} L_d & 0 \\ 0 & L_q \end{pmatrix} \cdot \frac{d}{dt}\begin{pmatrix} i_{dB} \\ i_{qB} \end{pmatrix} + \omega_{el} \cdot \begin{pmatrix} 0 & -L_q \\ L_d & 0 \end{pmatrix} \cdot \begin{pmatrix} i_{dB} \\ i_{qB} \end{pmatrix} + \begin{pmatrix} emk_{dB} \\ emk_{qB} \end{pmatrix}$$

In the present invention, these ideal model equations can be used although, due to possibly occurring angular offset between the rotating machine system and the d/q observer coordinate system, the inductivity matrixes might optionally also have to be adapted accordingly. For this purpose, only one possible EMF component is expanded in d direction. It has been shown that the equation system can remain unchanged otherwise, if the respective inductivities in d and q direction are identical. This is thus the case if inductivity $L_d$ is equal to inductivity $L_q$.

In the case of inductivities that differ from one another, the equation system can also remain unchanged, since then a characteristic that is stable in known limits and converges to an angular difference of zero is present.

For the estimation of the currents with hypothetical EMF, the model equations are rearranged after the derivations of the currents and integrated. For this purpose, reference is made to FIG. 3 which shows a block diagram of the EMF observer according to the following equations for the currents and the $emk_{db}$ and $emk_{dq}$ values resulting therefrom.

$$\begin{pmatrix} i_{dB} \\ i_{qB} \end{pmatrix} = \begin{pmatrix} \frac{1}{L_d} & 0 \\ 0 & \frac{1}{L_q} \end{pmatrix} \cdot$$

$$\int \left( \begin{pmatrix} u_{dB} \\ u_{qB} \end{pmatrix} - R_s \cdot \begin{pmatrix} i_{dB} \\ i_{qB} \end{pmatrix} - \omega_{el} \cdot \begin{pmatrix} 0 & -L_q \\ L_d & 0 \end{pmatrix} \cdot \begin{pmatrix} i_{dB} \\ i_{qB} \end{pmatrix} + \begin{pmatrix} emk_{dB} \\ emk_{qB} \end{pmatrix} \right) dt$$

As already explained above in the general description of the invention, the calculation of the EMFs occurs first by taking the difference between the measured currents $i_{dqBm}$ and the estimated currents $i_{dqB}$ and subsequent multiplication by the observer constants $K_{Bd,q}$.

$$emk_{dB} = K_{Bd} \cdot (i_{dB} - i_{dBm})$$

$$emk_{qB} = K_{Bd} \cdot (i_{dB} - i_{dBm})$$

For the calculation of $i_{dqB}$, the EMF thus calculated is returned in the above-represented integration term. The $emk_{db}$ and $emk_{dq}$ values determined are thus taken into account in the integral of the above-mentioned equation. After a Laplace transformation, the following equations are obtained as transfer function for the estimated EMF:

$$\frac{emk_{dB}}{emk_d} = \frac{1}{s \cdot \frac{L_d}{K_{Bd}} + 1} = \frac{1}{s \cdot T_B + 1}$$

$$\frac{emk_{qB}}{emk_q} = \frac{1}{s \cdot \frac{L_q}{K_{Bq}} + 1} = \frac{1}{s \cdot T_B + 1}$$

These equations are used according to the invention for carrying out the interpretation of the d/q observer system according to the observer constants $K_{BD}$ as follows:

$$K_{Bd} = \frac{L_d}{T_B}$$

$$K_{Bq} = \frac{L_q}{T_B}$$

Figure 4:
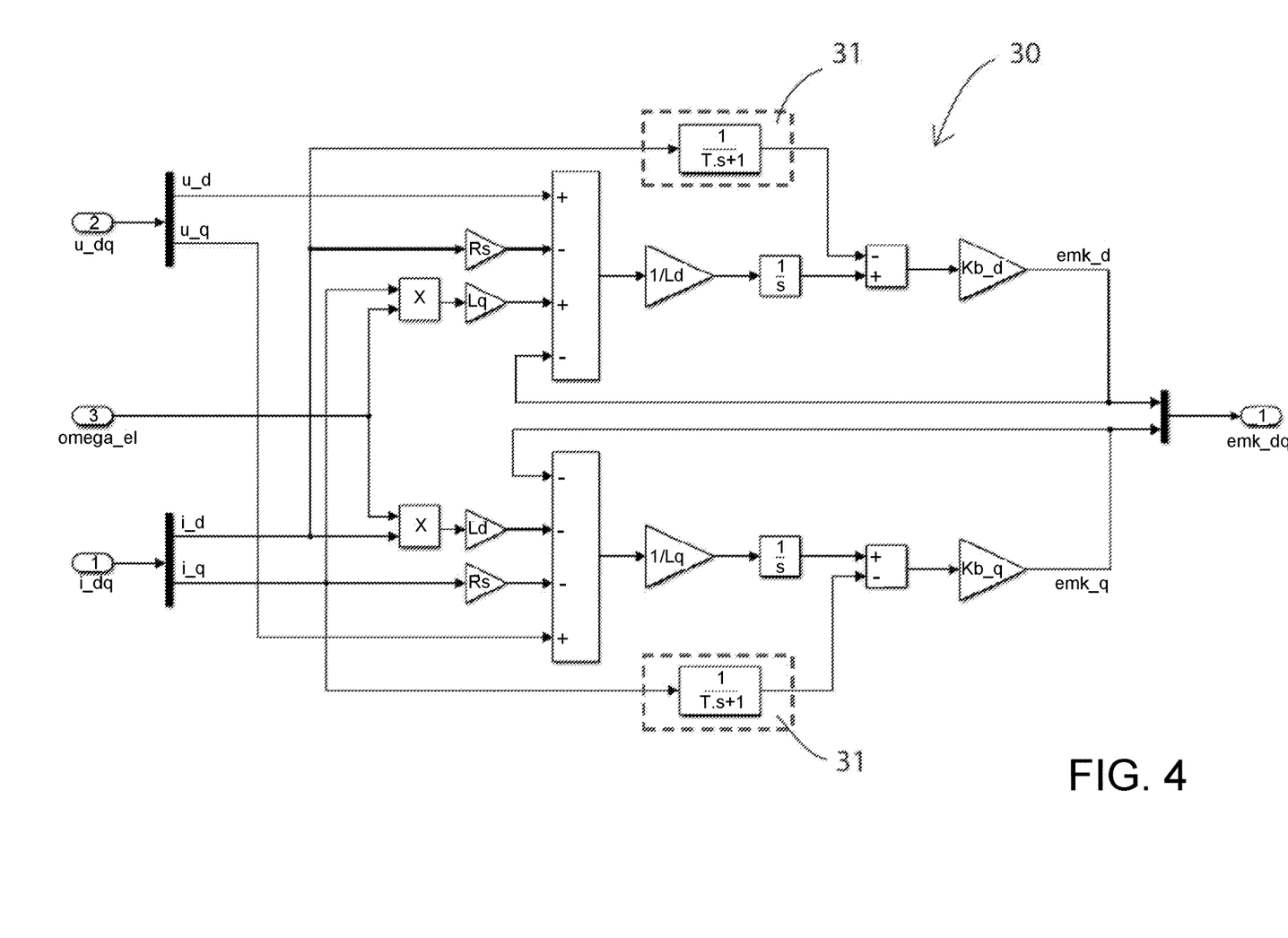
FIG. 4 shows a block diagram of an EMF observer with two low-pass filters.

In FIG. 4, an embodiment example according to the invention of an EMF observer 30 with one or in this case two low-pass filters 31 is represented as a block diagram. Such a configuration ensures a better signal quality and accordingly an optimized startup characteristic of the synchronous machine. As can be seen in FIG. 4, in each case a low-pass filter 31 is integrated in the respective signal path for the current and namely at a position which enables a signal processing before the subtraction thereof from the calculated currents of the observer. In order to avoid a bandwidth change of the EMF observer system, the time constant of the low-pass filter 31 can be set to the dimensioned observer time constant $T_B$ for the EMF estimation.

Below, in reference to FIGS. 5 to 9, an embodiment according to the invention of a PLL structure 40 for the orientation of the observer coordinate system is described. First, in FIG. 5, the overall system and furthermore the regulation loop are shown in principle, consisting of a phase detector 41, a phase regulator 42, a frequency-controlled oscillator 43 of which the output values are used as system values for the Clarke-Park transformation and for the EMF observer. The $emk_{dq}$ values are looped back to the phase detector 41 which determines the angular offset.

Figure 6:
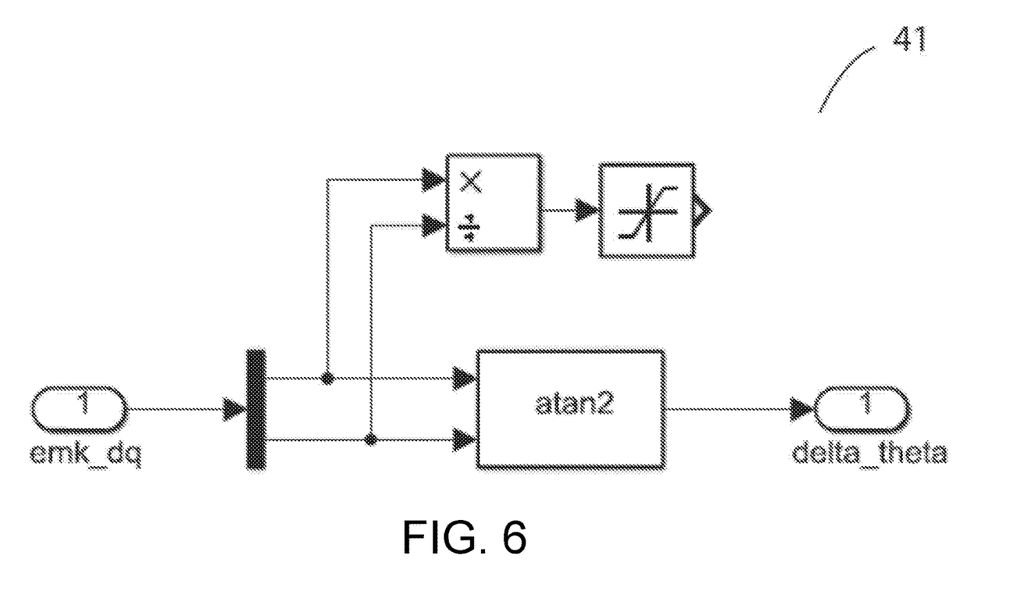
FIG. 6 shows a block diagram of a phase detector contained in the PLL structure of FIG. 5.

The phase detector 41 is represented in further detail in FIG. 6 in a block diagram. The phase detector 41 is used for the calculation of the angular offset $\Delta\theta_B$ between the machine coordinate system and the observer coordinate system as reference system based on the angular position of the EMF in the d/q observer coordinate system. In the machine coordinate system, in case of positive rotation frequency, the EMF is by definition present as a time derivative of the flux vector of the permanent magnets in the positive q axis. The phase detector 41 accordingly determines the angular position of the EMF in the d/q observer coordinate system with respect to the positive q axis. If the angular offset is zero, then the systems rotate congruently.

The following holds for the dependency of the EMF in the d/q observer coordinate system on the angular offset $\Delta\theta_B$:

$$emk_{dB} = \sin(\Delta\theta) \cdot emk_q$$

$$emk_{qB} = \cos(\Delta\theta) \cdot emk_q$$

The phase detector 41 accordingly delivers as output signal, which is determined as follows from the arctangent of the EMF, the value for the phase angular offset $\Delta\theta$:

$$\Delta\theta = \arctan\left(\frac{emk_{dB}}{emk_{qB}}\right)$$

For small angular offsets, and for the simplified calculation, a linearization can also occur, and the arc tangent can be replaced simply by a division of the EMF values. In this approximate calculation, a limitation of the range of values via a subsequent saturation member to the range of values of the arc tangent function is reasonable, in order to work only in the region of approximate linearization on this basis.

Figure 7:
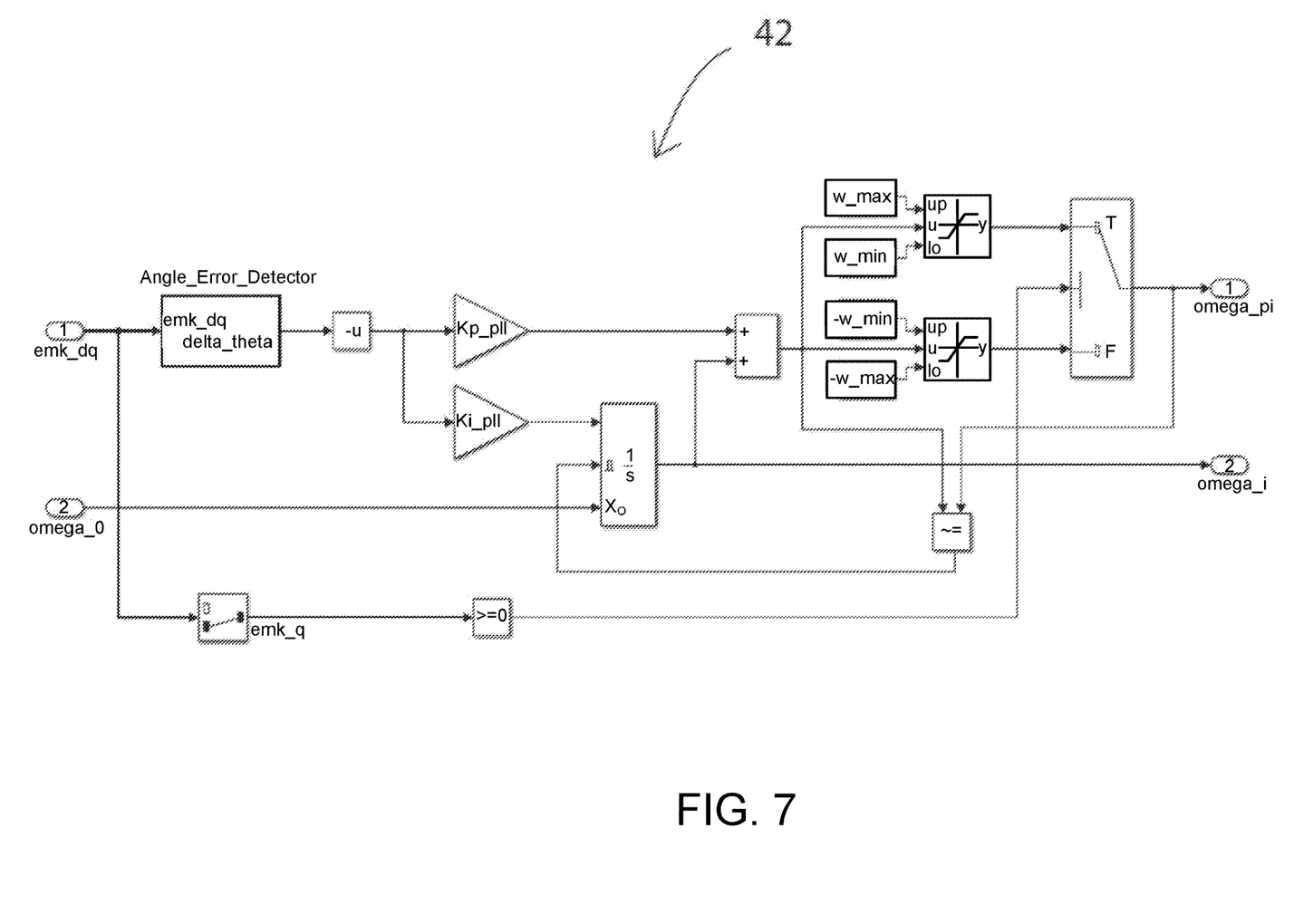
FIG. 7 shows a block diagram of a phase regulator from FIG. 6.

By means of the PLL structure 40, the updating of the observer coordinate system with respect to the angular position of the machine system based on the d components of the EMF is implemented. As indicated above, the angular position of the EMF estimated by the observer 30 is determined and supplied as deviation of the coordinate systems to the phase regulator 42. In FIG. 7, a block diagram of a phase regulator 42 is represented.

Figure 8:
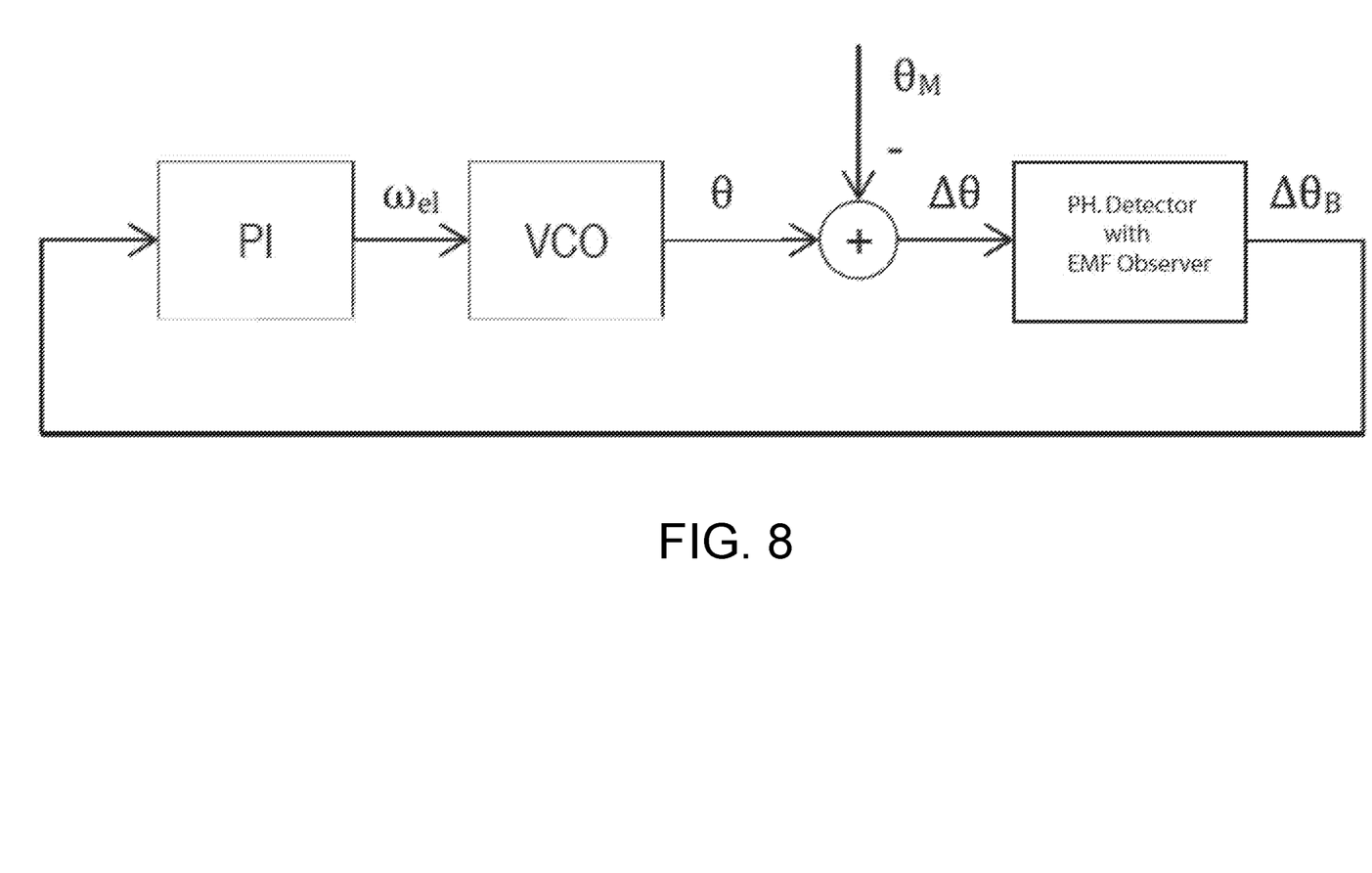
FIG. 8 shows a block diagram of the PLL regulation path.

The phase regulator 42 is shown moreover in FIG. 8, which represents the PLL regulation path as a block diagram. The phase regulator 42 is represented here as a PI regulator and it adjusts the angular offset to the value zero via the frequency specification for the downstream oscillator 43 for the generation of the angle signal for the transformation of the measured terminal values into the d/q observer coordinate system. I.e., depending on whether the EMF trails or leads, the instantaneous frequency of the observer coordinate system is reduced or increased, respectively corrected forward or backward.

The transfer function of the phase detector 41 with EMF observer is:

$$\Delta\theta_B \approx \frac{emk_{dB}}{emk_{qB}} = \frac{\frac{emk_q}{s \cdot T_B + 1} \Delta\theta}{emk_q} = \frac{1}{s \cdot T_B + 1} \cdot \Delta\theta$$

The transfer function of the phase regulator 42 is:

$$\frac{\omega_{el}}{\Delta\theta_B} = -K_P \cdot \left(1 + \frac{K_I}{s}\right)$$

The transfer function of the oscillator is:

$$\frac{\theta}{\omega_{el}} = \frac{1}{s}$$

Therefrom, the transfer function of the regulation path according to FIG. 8 can be determined $$\frac{\theta}{\theta_M} = \frac{F(s)}{F(s)+1} = \frac{s \cdot \frac{1}{K_I} + 1}{s^3 \cdot \frac{T_B}{K_P \cdot K_I} + s^2 \cdot \frac{1}{K_P \cdot K_I} + s \cdot \frac{1}{K_I} + 1}$$

and, by interpretation of the denominator polynomial by coefficient comparison $$s^3 \cdot \frac{T_B}{K_P \cdot K_I} + s^2 \cdot \frac{1}{K_P \cdot K_I} + s \cdot \frac{1}{K_I} + 1 = q_3 T^3 s^3 + q_2 T^2 s^2 + T s + 1$$

the setting parameters $K_P$, $K_I$ and $T_B$ of the PLL are obtained, as follows:

$$K_P = \frac{1}{q_2 \cdot T}$$

$$K_I = \frac{1}{T}$$

$$T_B = \frac{q_3}{q_2} \cdot T$$

Furthermore, by means of the phase regulator 42, an unequivocal assignment of the rotation directions to the position of the coordinate systems occurs. Depending on the rotation direction, there is by definition a positive or a negative q component of the EMF. In order to ensure an unequivocal assignment, the output saturation of the regulator is therefore changed depending on the mathematical sign of the q component of the EMF, and a saturation of the output rotation frequencies onto the corresponding positive or negative angular range is carried out.

In order to ensure the machine startup, the value of the rotation speed is limited to a lower limit value (minimum value), so that it is ensured at all times that an EMF that sets the rotor in rotation and which is provided directly by the phase detector start of the system occurs. Furthermore, an upper limit value (maximum value) for the value of the frequency is defined, which, via the anti-windup of the phase regulator 42 implemented as PI regulator 42, triggers a new initialization of the I portion, if the frequency runs into the limitation in case of the "falling out of step" of the system. In the activation of the phase regulator, the I portion of the regulator is also set to the rotation speed determined from an alternative initial speed determination. This also enables a connection of the observer system to a synchronous machine rotating already at high rotation speed, without having to configure the phase regulator unnecessarily rapidly in the case of an I-portion that has not been pre-initialized. The determination of the initial speed can occur in operation without active current feed, directly from the back measured terminal voltage of the machine, which in this case corresponds directly to the EMF.

Figure 9:
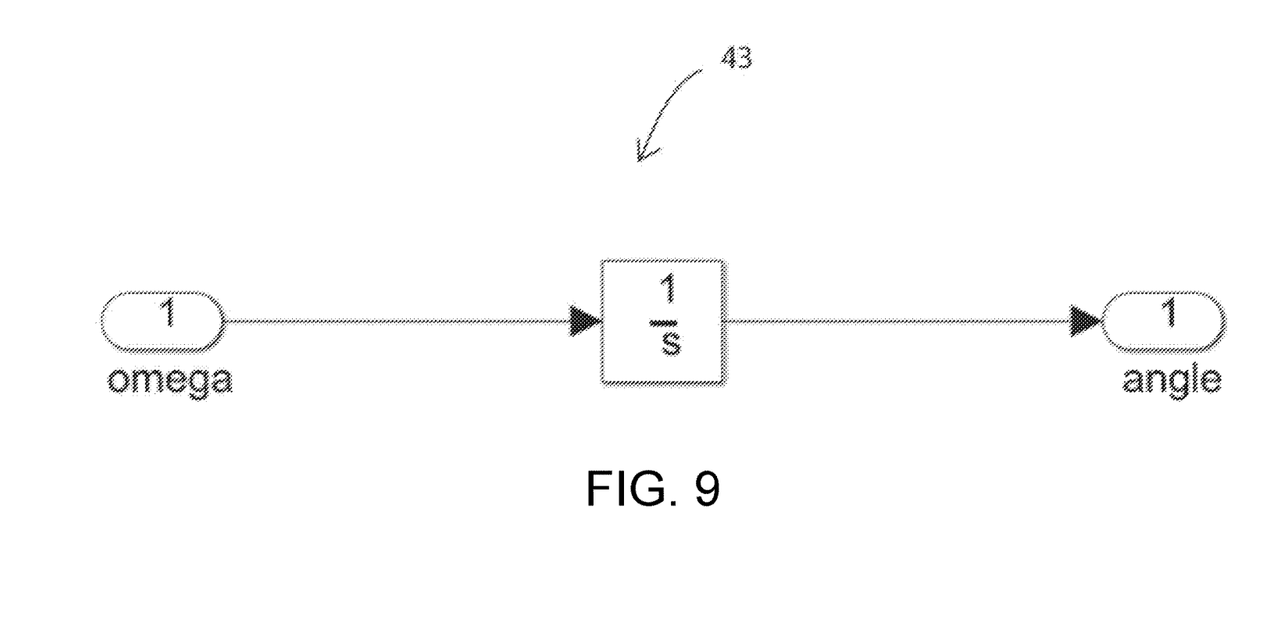
FIG. 9 shows a block diagram of an oscillator as used in the PLL structure.

In the block diagram of FIG. 9, the frequency-controlled oscillator 43 (VOC) is shown. It generates the terminal values measured for the transformation as well as the angle signal necessary for the motor commutation. The rate of change of the angle signal is here proportional to the frequency supplied at the input of the phase regulator. The frequency-controlled oscillator 43 therefore has for angle and angular speeds in radians a purely integrating characteristic.

Figure 10:
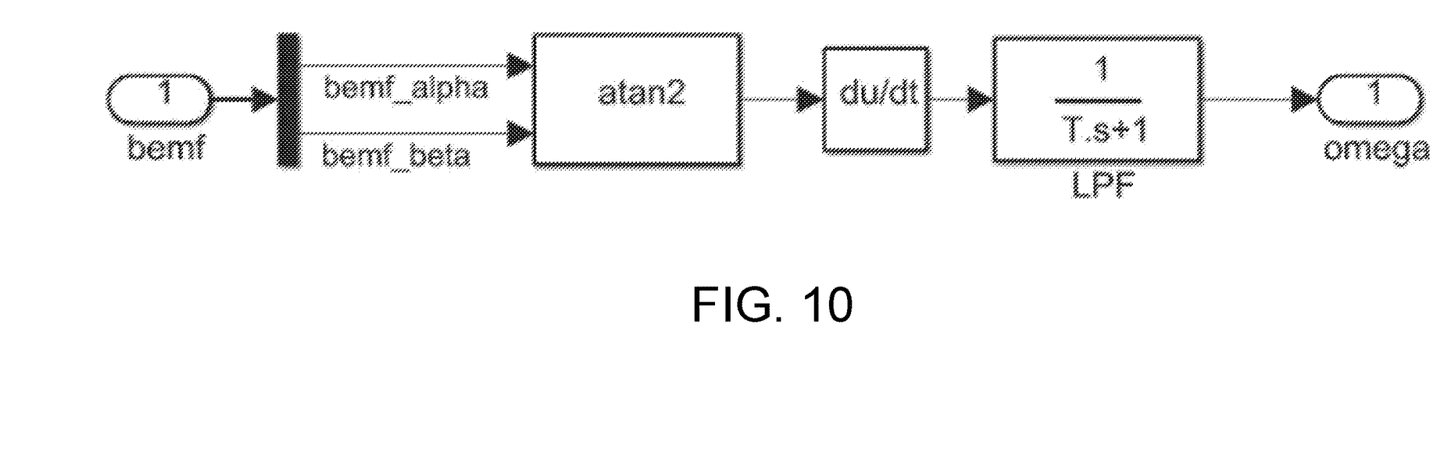
FIG. 10 shows a block diagram of the initial speed measurement.

In the block diagram of FIG. 10, it is represented how the initial speed determination occurs. Said initial speed determination is made based on the measured terminal voltage in the currentless state of the synchronous machine, for example, at the outlet or by means of an external drive. In the currentless state, the terminal voltage is equal to the EMF. For the determination of the initial speed, the rotor position angle is calculated from the Clarke-transformed measured function. From this, the instantaneous rotor rotation frequency is determined by means of the time derivative.

By a subsequent low-pass filtering, as explained in greater detail above, the signal quality, which worsened due to the differentiation, can be improved, since, in general, the dynamics required for the initial speed are generally not excessively high. Due to the initial speed determination, a connection of the observer coordinate system to a synchronous machine that is already rotating at high rotation speed can occur, without the need for an unnecessarily rapid design of the phase regulator, since the I portion thereof can be initialized at the time of the connection with the initial rotation frequency.

The implementation of the invention is not limited to the above-indicated preferred embodiment examples. Instead, numerous variants are conceivable, which use the represented solution even in designs of fundamentally different type.

The invention claimed is:

1. A circuit arrangement for rotor-position-sensorless commutation of an EC motor, preferably for sinusoidal commutation of a rotor-position-sensorless EC synchronous machine in a stepless continuous process from startup to stationary operation of the motor, wherein the circuit arrangement is for acquisition of terminal values of the motor, is connected to said motor, and comprises:

at least one Clarke-Park transformer for the transformation of the terminal values into a d/q observer coordinate system rotating synchronously with the rotor of the motor;

a detector which is designed for a determination of minimum signal values for activation of a coordinate system correction;

an observer for estimating an EMF (electromotive force); and a PLL structure for orienting the observer coordinate system, wherein the PLL structure comprises a phase regulator and an oscillator, for regulating an angular offset $\Delta\theta_B$ via a frequency input of the oscillator;

the phase regulator assigning a direction of rotation as a function of a mathematical sign of a q component of the EMF; and the phase regulator limiting output rotation frequency to within a corresponding range of positive or negative values, wherein the detector activates the phase regulator of the PLL structure for the coordinate system correction as soon as a system-specific threshold value for current or voltage amplitudes is exceeded.

2. The circuit arrangement according to claim 1, wherein a rotation angle of a d/q observer coordinate system is obtained from the PLL structure and said rotation angle of the d/q observer coordinate system is synchronized with a rotation angle of the rotor position.

3. The circuit arrangement according to claim 1, wherein the observer is provided with at least one low-pass filter in a respective signal path for a voltage or a current.

4. The circuit arrangement according to claim 1, wherein the PLL structure comprises a phase detector for calculating the angular offset $\Delta\theta B$ between a rotating machine coordinate system and a d/q observer coordinate system.

5. A method for commutation of an EC synchronous machine with a circuit arrangement according to claim 1, wherein the terminal values at connection terminals of the EC synchronous machine are processed by means of a rotor position estimator based on the EMF of the synchronous machine and of a known motor model, preferably in a PLL structure for sensorless determination of rotor position information, and said terminal values are used for the commutation.

6. The method according to claim 5, wherein at least the following steps are implemented in the method for commutation:
   a. determining the terminal values, preferably motor phase currents and/or electrical voltage(s) applied to connection terminals of the motor;
   b. transforming the terminal values by Clarke-Park transformation into a d/q observer coordinate system; and
   c. processing the terminal values in the PLL structure into rotor position information for use in the commutation.

7. The method according to claim 6, wherein, in the transformation in step b), the terminal values are first transformed from a three-phase stator abc system into a two-phase orthogonal alphabeta system by means of a Clarke transformation, and then they are further transformed into a rotating d/q observer coordinate system by means of a Parke transformation.

8. The method according to claim 6, wherein an estimation of the EMF of the synchronous machine occurs by means of the observer, preferably indirectly by the determination of the terminal values from step a) based on the voltages applied to the synchronous machine.

9. The method according to claim 5, wherein the PLL structure for rotor position estimation performs the transformation of measured terminal values into a coordinate system rotating synchronously with the rotor so that a rotation angle of said coordinate system originates from the PLL structure itself and corresponds to the rotor position which is necessary for the commutation.

10. The method according to claim 5, wherein, by means of a phase detector of the PLL structure, a calculation of the angular offset between machine coordinate system and d/q observer coordinate system occurs based on an angular position of the EMF in the d/q observer coordinate system.

11. The method according to claim 5, wherein a relative position of a d/q observer coordinate system during operation is corrected by a targeted evaluation of the EMF of the synchronous machine with respect to the d/q observer coordinate systems of the machine oriented toward a rotor flux of the rotor of the synchronous machine and used for modeling of the machine, and is preferably synchronized with said observer coordinate system.

12. The circuit arrangement according to claim 1, wherein, by means of a calculation method, a current calculation occurs, by solving machine equations in accordance with current time derivatives and by performing integration with a hypothetical (theoretical) EMF and actually measured values; and weighted difference between the calculated current and the measured current is returned as a previously hypothetically assumed EMF and is output as EMF output signal of the observer.

13. The circuit arrangement according to claim 1, wherein a rotation angle for a rotor position correction occurs by means of a frequency-controlled oscillator by integration of a predetermined frequency setpoint, and the rotation frequency of the motor is determined by means of a temporal change of the rotation angle.

14. The circuit arrangement according to claim 1, wherein a value of rotation speed is limited to a lower limit value (minimum value), such that it is ensured that an EMF always occurs which sets the rotor in rotation and which is provided directly by the phase detector start of the system, and/or, furthermore, an upper limit value (maximum value) for the value of the frequency is defined, which, via an anti-windup of the phase regulator, triggers a new initialization of an I (integral) portion if a frequency of the system runs into the limitation.

15. A circuit arrangement for rotor-position-sensorless commutation of an EC motor, preferably for sinusoidal commutation of a rotor-position-sensorless EC synchronous machine in a stepless continuous process from startup to stationary operation of the motor, wherein the circuit arrangement is for acquisition of terminal values of the motor, is connected to said motor, and comprises:
   at least one Clarke-Park transformer for the transformation of the terminal values into a d/q observer coordinate system rotating synchronously with the rotor of the motor;
   a detector which is designed for a determination of minimum signal values for activation of a coordinate system correction;
   an observer for estimating an EMF (electromotive force); and
   a PLL structure for orienting the observer coordinate system, wherein
      the PLL structure comprises a phase regulator and an oscillator, for regulating an angular offset $\Delta\theta_B$ via a frequency input of the oscillator;
      the phase regulator assigning a direction of rotation as a function of only a mathematical sign of a q component of the EMF; and
      the phase regulator limiting output rotation frequency to within a corresponding range of positive or negative values.

* * * * *